(12) United States Patent
Fujita et al.

(10) Patent No.: US 9,807,210 B2
(45) Date of Patent: Oct. 31, 2017

(54) CORDLESS PHONE (71) Applicant: Panasonic Intellectual Property Management Co., Ltd., Osaka (JP)

(72) Inventors: Shuhei Fujita, Fukuoka (JP); Toshihide Mori, Fukuoka (JP); Toshiya Sakai, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/299,097

(22) Filed: Oct. 20, 2016

(65) Prior Publication Data
US 2017/0126856 A1 May 4, 2017

(30) Foreign Application Priority Data

Oct. 30, 2015 (JP) ................................ 2015-214116

(51) Int. Cl.
*H04M 1/02* (2006.01)
*H04M 1/03* (2006.01)

(52) U.S. Cl.
CPC ........... *H04M 1/0202* (2013.01); *H04M 1/03* (2013.01)

(58) Field of Classification Search
None
See application file for complete search history.

(56) References Cited

U.S. PATENT DOCUMENTS

| 6,058,315 | A * | 5/2000 | Clark | .................. | H04M 1/0214 |
| | | | | | 379/430 |
| 7,565,178 | B1 * | 7/2009 | Sitachitt | ................ | H04M 1/035 |
| | | | | | 379/430 |
| 2002/0006806 | A1 * | 1/2002 | Kinnunen | ............ | H04B 1/3833 |
| | | | | | 455/550.1 |
| 2005/0164745 | A1 * | 7/2005 | Oe | ......................... | H04M 1/021 |
| | | | | | 455/566 |
| 2007/0049359 | A1 * | 3/2007 | Sung | .................... | H04M 1/0202 |
| | | | | | 455/575.1 |
| 2014/0315605 | A1 * | 10/2014 | Cho | ....................... | H04M 1/035 |
| | | | | | 455/575.1 |
| 2014/0378191 | A1 * | 12/2014 | Hosoi | ................. | H04M 1/6066 |
| | | | | | 455/575.1 |
| 2016/0127524 | A1 * | 5/2016 | Kanemaki | ............... | H04M 1/03 |
| | | | | | 455/575.1 |

FOREIGN PATENT DOCUMENTS

JP 2008-028595 A 2/2008

* cited by examiner

*Primary Examiner* — David Bilodeau
(74) *Attorney, Agent, or Firm* — Seed IP Law Group LLP (57) ABSTRACT A cordless phone includes an earpiece speaker, a ringtone speaker, a front casing in which the earpiece speaker is held and a reception sound opening covered by the earpiece speaker is formed, a rear casing in which the ringtone speaker is held and a ringtone opening covered by the ringtone speaker is formed, an earpiece speaker rear opening formed in the rear casing, and a cushion material. The cushion material is in close contact with an inner wall surface of the rear casing, surrounds the earpiece speaker rear opening, is in close contact with a rear surface of the earpiece speaker, separates the rear surface of the earpiece speaker from a space in the casing defined based on the front casing and the rear casing, and allows the rear surface of the earpiece speaker to be in communication with the earpiece speaker rear opening.

7 Claims, 7 Drawing Sheets

CORDLESS PHONE

BACKGROUND

1. Technical Field

This disclosure relates to a cordless phone.

2. Description of the Related Art

In the related art, a portable electronic device capable of yielding a large volume has been known (for example, see Japanese Patent Unexamined Publication No. 2008-28595). The portable electronic device includes a speaker, a casing that accommodates the speaker, and a rear wall fixed to the inside of the casing. The rear surface of the speaker opposes the rear wall, and the speaker makes a sound in response to a user's switch operation. The portable electronic device includes a drive mechanism that operates in conjunction with the user's switch operation. The speaker is connected to the drive mechanism, and protrudes from the inside of the casing by the operation of the drive mechanism such that the interval between the speaker and the rear wall is expanded.

According to the portable electronic device, the interval between the speaker and the rear wall is expanded, such that attenuation of sound reaching the rear wall from the speaker and attenuation of reflected sound reaching the speaker position from the real wall increase, as compared to a case where the speaker and the rear wall are close to each other. As a result, sound that came out from the speaker is emitted to the front of the casing, without significant volume reduction.

However, if it is assumed that a cordless phone equipped with a large speaker capable of yielding reception sound of a large volume has the configuration of Japanese Patent Unexamined Publication No. 2008-28595, the large speaker occupies a large space inside a casing, such that the rest of the space is too small to further provide the drive mechanism. If the drive mechanism of Japanese Patent Unexamined Publication No. 2008-28595 is provided in addition to the large speaker which is equipped, the structure of the cordless phone is complicated, and the size thereof increases.

In addition, a ringtone speaker is provided in the cordless phone, separately from the earpiece speaker. In the ringtone speaker, ringtone openings are provided in the rear surface of the casing which is the opposite side of the front side of the casing having reception sound openings provided therein. The ringtone speaker needs to occupy a large space in the casing in order to yield sound of a large volume which is easily heard. From this fact, the space in the casing needs to be prevented from being complex. Further, in the cordless phone, in a case of using the space in the casing as a reflected sound reduction space of the ringtone speaker, the ringtone from the rear surface of the ringtone speaker is likely to propagate to the accommodate space of the earpiece speaker. In particular, in a cordless phone equipped with such a ringtone speaker that yields ringtone of a large volume, it is necessary to avoid the ringtone which comes out from the rear surface from creeping to a receiving side.

SUMMARY

The present disclosure has been made in view of the situation described above in the related art, and an object is to provide a cordless phone capable of yielding a large volume, and preventing sound from creeping from a ringtone speaker to an earpiece speaker, with a simple structure.

The present disclosure is to provide a cordless phone including an earpiece speaker; a ringtone speaker; a front casing in which the earpiece speaker is held and a reception sound opening covered by the earpiece speaker is formed; a rear casing in which the ringtone speaker is held and a ringtone opening covered by the ringtone speaker is formed; an earpiece speaker rear opening which is formed in the rear casing; and a cushion material which is in close contact with an inner wall surface of the rear casing at one end surface thereof, and surrounds the earpiece speaker rear opening, and is in close contact with a rear surface of the earpiece speaker at the other end surface thereof, separates the rear surface of the earpiece speaker from a space in the casing defined based on the front casing and the rear casing, and allows the rear surface of the earpiece speaker to be in communication with the earpiece speaker rear opening.

According to the present disclosure, it is possible to yield a large volume, and prevent sound from creeping from a ringtone speaker to an earpiece speaker, with a simple structure.

DETAILED DESCRIPTION

Hereinafter, respective embodiments which specifically disclose a cordless phone will be described in detail, with reference to appropriate drawings. However, detailed description more than necessary may be omitted in some cases. For example, detailed description of already well-known matters and duplicate descriptions for substantially the same components may be omitted in some cases. This is to facilitate the understanding of those skilled in the art, by avoiding the following description from being unnecessarily redundant. In addition, the accompanying drawings and the following description are provided in order to help those skilled in the art fully understand the present disclosure, and are not intended to limit the subject described in claims.

Figure 1:
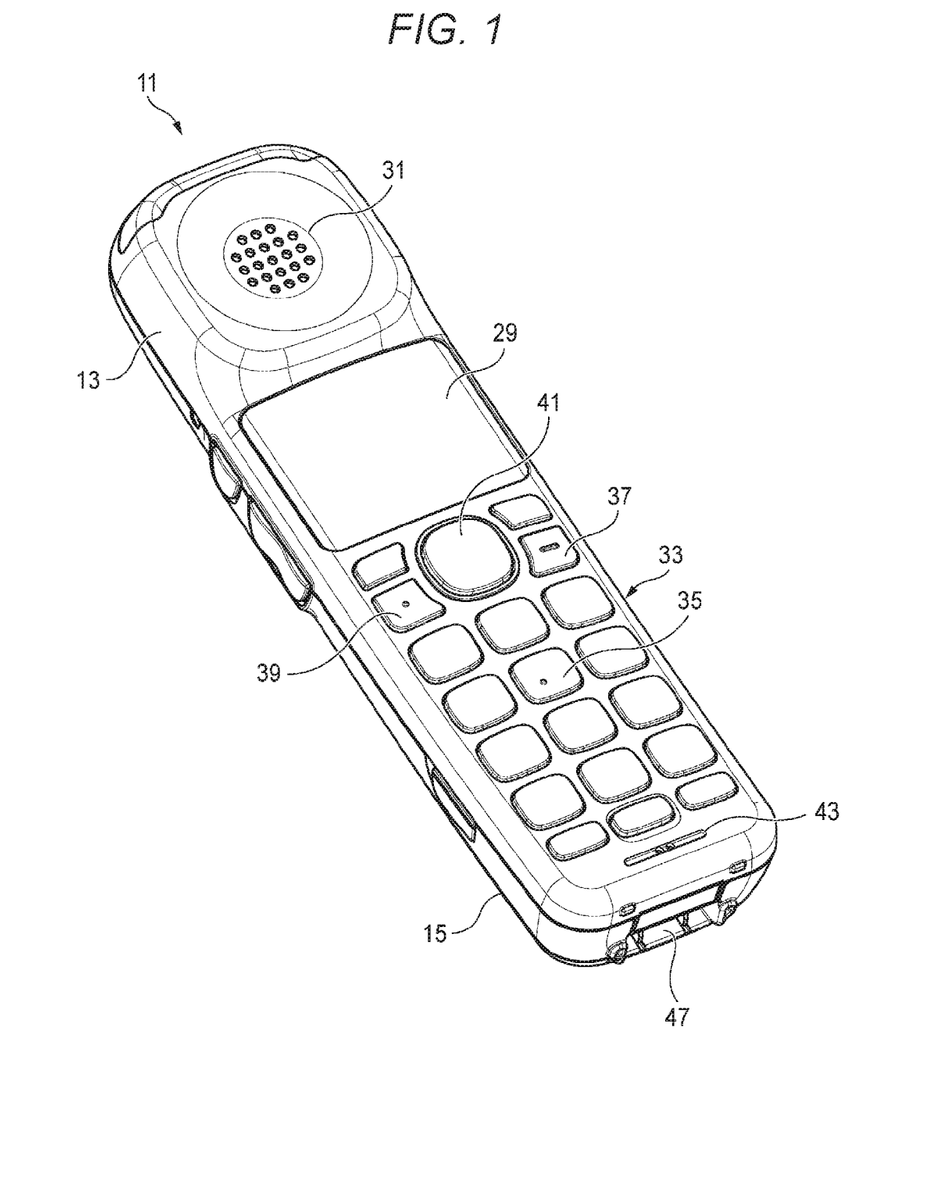
FIG. 1 is an exterior perspective view of a cordless phone according to an embodiment.

FIG. 1 is an exterior perspective view of cordless phone 11 according to an embodiment. Cordless phone 11 according to this embodiment includes front casing 13, rear casing 15, earpiece speaker 17, ringtone speaker 19, earpiece speaker rear opening 21, and cushion material 23, as main components. In this specification, the "front" of cordless phone 11 indicates a side to which the ear of a sender or a receiver is placed, and the "rear" indicates a side opposite to the front.

In cordless phone 11, front casing 13 and rear casing 15 are formed of, for example, synthetic resins such as ABS resins. Front casing 13 and rear casing 15 are combined to configure an outer shell, and the inner side thereof is space 25 in the casing. In other words, space 25 in the casing is formed, based on front casing 13 and rear casing 15 which are combined. The outer shell is approximately a flat rectangular parallelepiped. Space 25 in the casing accommodates earpiece speaker 17 (see FIG. 3), print board 27 (see FIG. 3) on which a plurality of electronic components (Integrated Circuit (IC), Central Processing Unit (CPU), Random Access Memory (RAM), Read Only Memory (ROM), and the like) are mounted, ringtone speaker 19 (see FIG. 5), and the like.

Display 29 formed of a liquid crystal display (LCD) is provided on the surface of front casing 13. Reception sound opening 31 is formed on one-end side in a longitudinal direction of front casing 13. Reception sound opening 31 has, for example, a plurality of circular through-holes which penetrate front casing 13. Reception sound opening 31 is covered with earpiece speaker 17 which is fixed in space 25 in the casing, from space in the casing side.

Operator 33 is disposed on the opposite side of reception sound opening 31 across display 29 in front casing 13. Operator 33 includes, for example, numeric key 35 such as "0" to "9" keys, a "#" key, and a "f" key, off-hook key 37, on-hook key 39, function key 41, and the like. Mouthpiece 43 is disposed on the opposite side of display 29, across operator 33 of front casing 13 (that is, on the other-end side in a longitudinal direction of front casing 13). Mouthpiece 43 is disposed facing microphone 45 (see FIG. 5) fixed to print board 27 or the like, in space 25 in the casing which is a rear side. Charging port 47 connected to the power circuit of print board 27 is provided in an edge surface adjacent to mouthpiece 43 on the other-end side of cordless phone 11 in the longitudinal direction.

Figure 2:
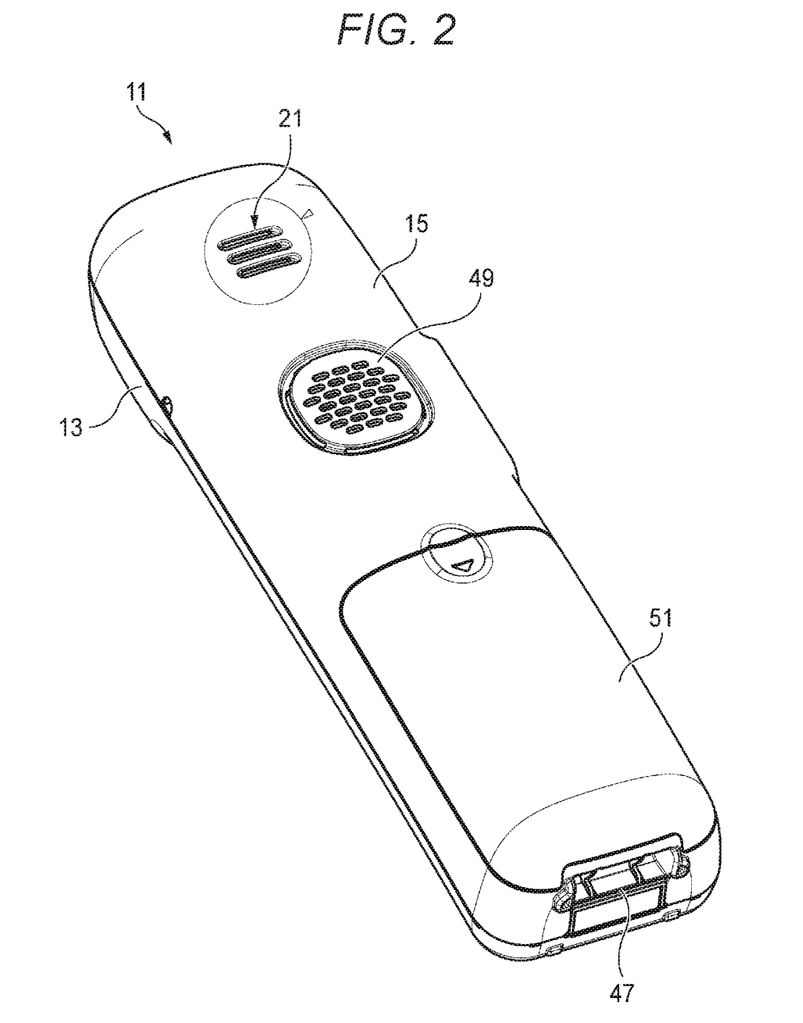
FIG. 2 is a rear view of the cordless phone illustrated in FIG. 1.

FIG. 2 is a rear view of cordless phone 11 illustrated in FIG. 1. Ringtone opening 49 is formed in rear casing 15. Ringtone opening 49 has a plurality of through-holes which penetrate rear casing 15. Ringtone opening 49 is covered with ringtone speaker 19 (see FIG. 5) which is fixed in space 25 in the casing, from space in the casing side.

Earpiece speaker rear opening 21 is formed on one-end side in a longitudinal direction of rear casing 15. Earpiece speaker rear opening 21 has, for example, one or more (for example, three) oval-shaped through-holes which penetrate rear casing 15.

Battery lid 51 is provided detachably on the opposite side of earpiece speaker rear opening 21, across ringtone opening 49 of rear casing 15 (that is, on the other-end side in a longitudinal direction of rear casing 15). Battery lid 51 opens and closes a battery housing provided in space 25 in the casing. Battery connected to the power circuit of print board 27 is installed in the battery housing in a freely replaceable manner.

Figure 3:
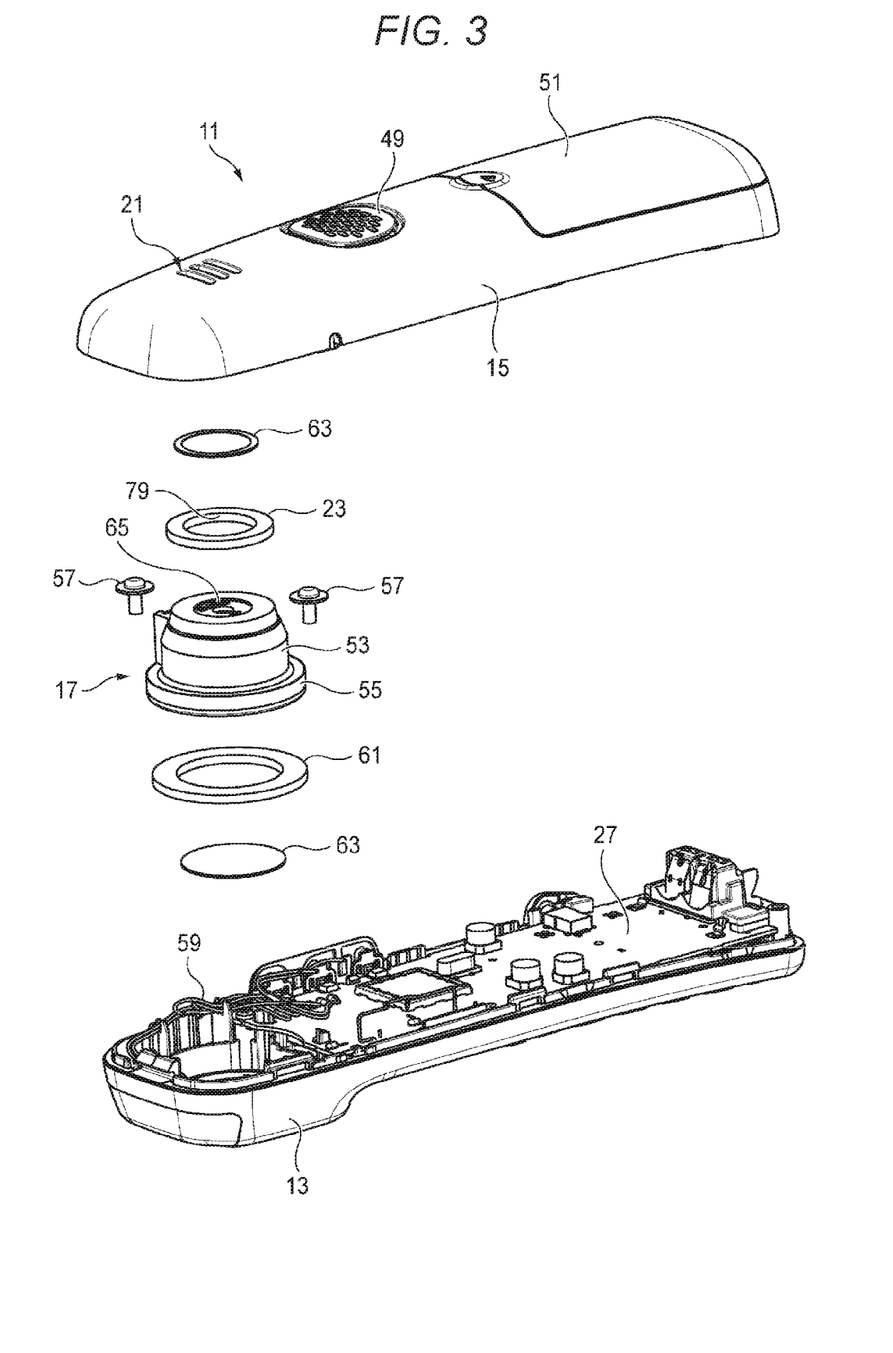
FIG. 3 is an exploded perspective view of the cordless phone illustrated in FIG. 1.

FIG. 3 is an exploded perspective view of cordless phone 11 illustrated in FIG. 1. Earpiece speaker 17 includes cylindrical body 53, and flange 55 having a large diameter at the front of body 53. In earpiece speaker 17, flange 55 is fixed to speaker fixing part 59 of front casing 13 by speaker fixing screw 57. Elastic ring-shaped sealing material 61 is interposed between earpiece speaker 17 and speaker fixing part 59. Sealing material 61 cuts a space between the front surface of earpiece speaker 17 and the inner wall surface of front casing 13 off from space 25 in the casing. For example, net 63 for prevention of dust invasion, made from non-woven cloth or the like, is interposed between sealing material 61 and speaker fixing part 59, as needed (hereinafter, the same).

In earpiece speaker 17, open hole 65 is provided on the rear surface of body 53. Sound signals (similarly, hereinafter simply referred to as "sound") having an opposite phase of reception sound signals (hereinafter simply referred to as "reception sound") are output from open hole 65. The rear surface of earpiece speaker 17 is opposed to earpiece speaker rear opening 21 of rear casing 15. Annular cushion material 23 is disposed between the rear surface of earpiece speaker 17 and earpiece speaker rear opening 21. For example, net 63 made from non-woven cloth or the like is interposed between cushion material 23 and the inner wall surface of rear casing 15.

With respect to earpiece speaker 17, a range (frequency domain) is a full-range (for an entire band). Earpiece speaker 17 is an electrokinetic system with permanent magnets. The electrokinetic system may be either a dynamic type in which a coil is movable, or a magnetic type in which a piece of iron is movable. In addition, vibration plate 67 which vibrates by a coil or a piece of iron may be any one of a cone type, a dome type, a flat type, and a ribbon type.

In earpiece speaker 17, the magnetic field caused by a voice current of the coil overlaps the magnetic field of the permanent magnets, the piece of iron is vibrated depending on the strength of the magnetic field, and vibration plate 67 connected to the piece of iron is vibrated. In earpiece speaker 17, the reception sound progresses from vibration plate 67 to the reception sound opening side. On the other hand, in earpiece speaker 17, sound having an opposite phase of reception sound progresses from the rear surface of vibration plate 67 to rear casing side by open hole 65.

Earpiece speaker 17 has a predetermined acoustic performance which is greater than usual. The predetermined acoustic performance satisfies, for example, the United States standards (ANSI/TIA-4953). The acoustic performance of cordless phone 11 especially satisfies "Severe" in "Hearing Loss Category" of "Table 1" of the same standard.

Figure 4:
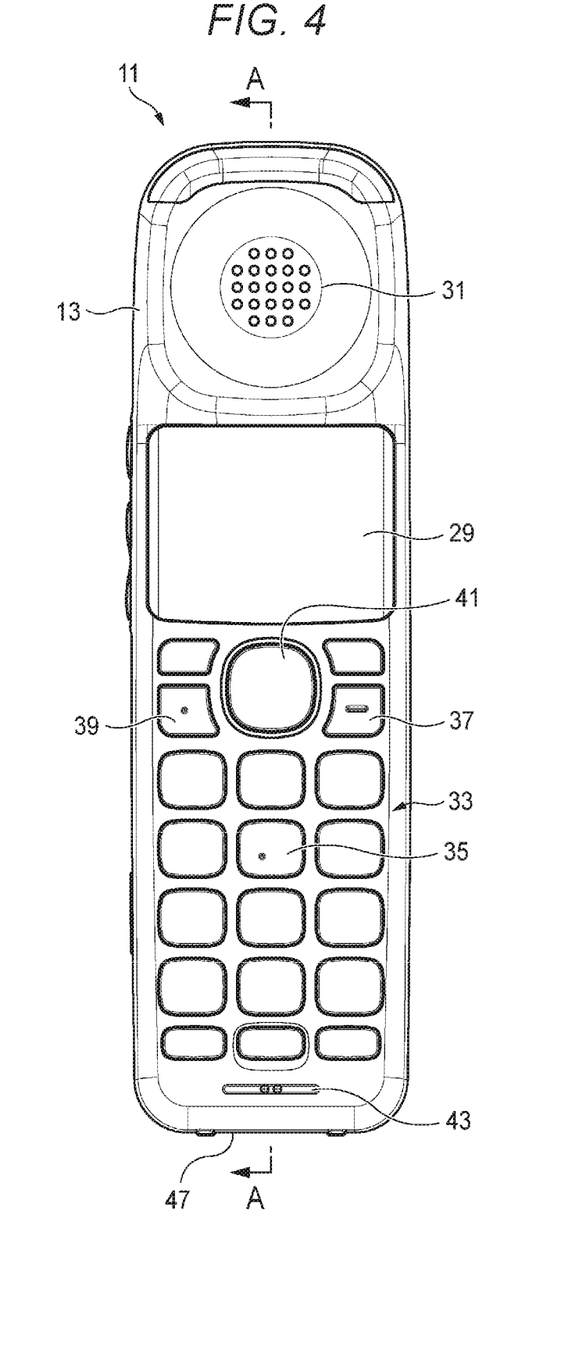
FIG. 4 is a front view of the cordless phone illustrated in FIG. 1.
Figure 5:
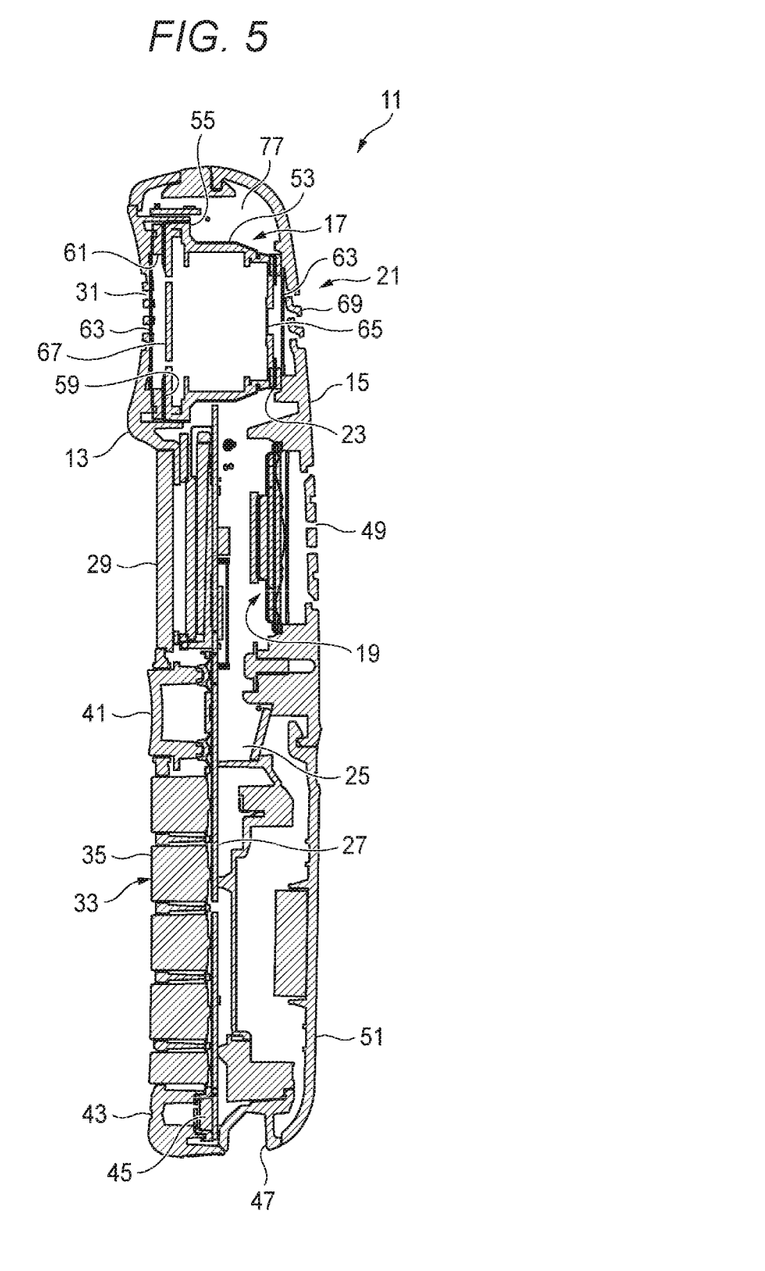
FIG. 5 is an A-A sectional view of FIG. 4.

FIG. 4 is a front view of cordless phone 11 illustrated in FIG. 1. FIG. 5 is an A-A sectional view of FIG. 4. Ringtone speaker 19 emits a ringtone from ringtone opening 49 of rear casing 15, for example, when there is an incoming call, or an email is received. Ringtone opening 49 is covered with ringtone speaker 19 which is fixed in rear casing 15 in space 25 in the casing, from space in the casing side. Ringtone speaker 19 also includes a vibration plate (not illustrate), similar to earpiece speaker 17. Thus, in ringtone speaker 19, sound having an opposite phase of the ringtone is emitted to space 25 in the casing.

Figure 6:
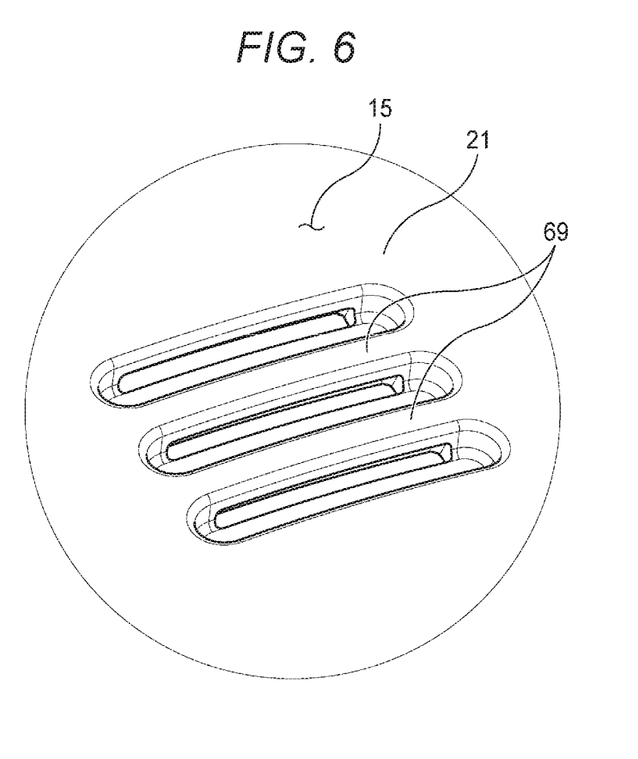
FIG. 6 is a perspective view of a rear opening of an earpiece speaker illustrated in FIG. 2, as viewed from the outside.

FIG. 6 is a perspective view of earpiece speaker rear opening 21 illustrated in FIG. 2, as viewed from the outside. Earpiece speaker rear opening 21 is formed in rear casing 15. Earpiece speaker rear opening 21 is obscured by louver 69 such that space 25 in the casing cannot be directly seen from the outside. At the same time, louver 69 defines earpiece speaker rear opening 21 into a plurality of (for example, three) oval-shaped through-holes.

Figure 7:
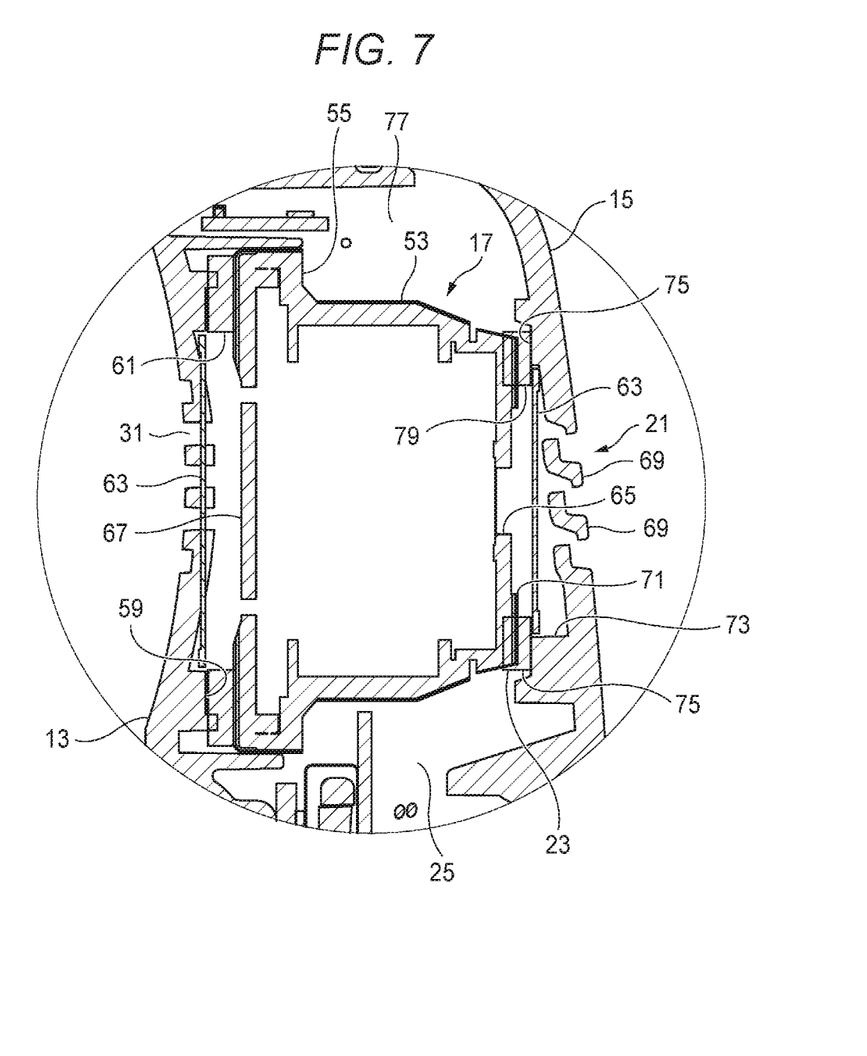
FIG. 7 is an enlarged view of main parts of FIG. 5 which represents the vicinity of the earpiece speaker.

FIG. 7 is an enlarged view of main parts of FIG. 5 which represents the vicinity of earpiece speaker 17. Cushion material 23 which is provided between the rear surface of earpiece speaker 17 and earpiece speaker rear opening 21 is formed into a ring shape. More specifically, it is formed into a ring shape or a cylindrical shape. The outer shape of cushion material 23 may be either a circular shape or a polygonal shape, including an inner hollowed shape. In the present embodiment, cushion material 23 is formed into a circular ring shape. Cushion material 23 is attached to earpiece speaker 17 or an inner wall surface, by double-sided tape 71 stretched on one end surface or the other end surface. In addition, cushion material 23 of FIG. 7 is drawn by being overlapped with double-sided tape 71 or the rear surface of earpiece speaker 17, but this is a schematic representation, and actually, cushion material is compressed in a thickness direction, and is located on any one side surface of double-sided tape 71.

Cushion material 23 is in close contact with the inner wall surface of rear casing 15 at one end surface thereof, and surrounds earpiece speaker rear opening 21. Further, cushion material 23 is in close contact with the rear surface of earpiece speaker 17 at the other end surface thereof, and the rear surface is separated from space 25 in the casing of front casing 13 and rear casing 15 which are combined. Thus, cushion material 23 allows the rear surface of earpiece speaker 17 to be in communication with earpiece speaker rear opening 21.

As a material of cushion material 23, for example, sponge (such as Neoprene sponge, EP sponge, or silicone rubber sponge), Urethane foam, or the like can be used. However, in a case of a bubble structure, it is preferable that cushion material 23 is made of those obtained by making bubbles independent (independent bubbles). The air bubble structure in this case is configured not to communicate an independent bubble made by communicating about one or two bubbles, with other independent bubbles. This can suppress sound from passing through cushion material 23 due to open air bubbles. In addition, cushion material 23 may be a material which is sealed with rubber or a curing agent of a liquid form.

In this embodiment, cordless phone 11 has peripheral wall 73 on the inner wall surface of rear casing 15. Peripheral wall 73 is formed into an annular shape in which standing tip surface 75 is parallel to the rear surface of earpiece speaker 17. Peripheral wall 73 is integrated with rear casing 15 through resin molding. The one end surface of cushion material 23 is in close contact with standing tip surface 75 of peripheral wall 73. That is, ring-shaped cushion material 23 is in close contact with standing tip surface 75 of peripheral wall 73 at one end surface thereof, and is in close contact with the rear surface of earpiece speaker 17 at the other end surface thereof. Thus, the rear surface of earpiece speaker 17 is released to the outside from earpiece speaker rear opening 21 without passing through space 25 in the casing. In addition, for example, net 63 made from non-woven cloth is interposed between cushion material 23 and standing tip surface 75.

In addition, cordless phone 11 has annular space 77 in which space 25 in the casing surrounds earpiece speaker 17. Earpiece speaker 17 has cylindrical body 53 described above. Annular space 77 is a space that surrounds the outer periphery of body 53. Annular space 77 is in communication with the other space 25 in the casing, for example, the rear surface side of ringtone speaker 19.

Next, the operation of cordless phone 11 according to the afore-mentioned present embodiment will be described.

In Cordless phone 11 according to the present embodiment, front casing 13 includes reception sound opening 31, and rear casing 15 includes ringtone opening 49. Reception sound opening 31 of front casing 13 is blocked by earpiece speaker 17, and ringtone opening 49 of rear casing 15 is blocked by ringtone speaker 19. If front casing 13 and rear casing 15 are combined, space 25 in the casing, only earpiece speaker rear opening 21 is open to the outside. Earpiece speaker rear opening 21 is blocked by cushion material 23 which surrounds earpiece speaker rear opening 21 while one end surface thereof being in close contact with the inner wall surface of rear casing 15.

Cushion material 23 is in close contact with the rear surface of earpiece speaker 17 at the other end surface thereof. Earpiece speaker 17 is connected to earpiece speaker rear opening 21 through inner hole 79 of cushion material 23 and is open to the outside. Thus, a certain level or more of a rear space volume is ensured in earpiece speaker 17, and the acoustic performance of the predetermined standards (ANSI/TIA-4953) for the sound emitting from reception sound opening 31 of earpiece speaker 17 can be ensured in earpiece speaker 17.

In addition, since earpiece speaker rear opening 21 and the rear surface of earpiece speaker 17 are connected by cushion material 23, actually, space 25 in the casing is in a state where earpiece speaker rear opening 21 is cut off from space 25 in the casing. In other words, space 25 in the casing is a closed space. Thus, it is possible to ensure a predetermined (the standard for acoustic shock in the United States) acoustic performance, for the sound pressure of the sound emitted from ringtone speaker 19 being leaked from reception sound opening 31 of earpiece speaker 17. In addition, a certain or more volume on the rear surface of ringtone speaker 19 allows the acoustic performance of ringtone speaker 19 to be improved.

Since the rear space of earpiece speaker 17 is defined by inner hole 79 of cushion material 23, it is blocked from space 25 in the casing. Therefore, the sound that came out from the rear surface of ringtone speaker 19 is suppressed from inputting to the rear space of earpiece speaker 17 from space 25 in the casing.

In this manner, in cordless phone 11, the securing of the rear space volume of earpiece speaker 17, and the suppression of creeping of the sound that came out from the rear surface of ringtone speaker 19 to reception sound opening 31 are realized with a simple structure using only cushion material 23.

In addition thereto, in cordless phone 11, since cushion material 23 has a predetermined compression range, it has a function of absorbing the variation in the distance between the rear surface of earpiece speaker 17 and the inner wall surface of rear casing 15, which is caused by the dimensional tolerance, manufacturing error or the like. Thus, for example, during the assembly of the front casing and the rear casing, it is possible to avoid troubles such as swelling by being pushed by the earpiece speaker in advance.

In addition, in cordless phone 11, earpiece speaker 17 and the inner wall surface of rear casing 15 are connected by cushion material 23. Earpiece speaker 17 and cushion material 23 are formed into a continuous columnar shape and cross space 25 in the casing in the back-and-forth direction. In other words, space 25 in the casing includes annular space 77 which surrounds earpiece speaker 17 and the outer periphery of cushion material 23. In cordless phone 11, since annular space 77 is used as a part of space 25 in the casing, it is possible to secure a larger rear space volume than a volume for the ringtone speaker.

In addition, in cordless phone 11, when front casing 13 and rear casing 15 are combined to define space 25 in the casing, the rear surface of earpiece speaker 17 which is attached to front casing 13 and standing tip surface 75 of peripheral wall 73 formed in the inner wall surface of rear casing 15 form a shape without a gap therebetween so as to be sealed, for example, a parallel shape.

Before being mounted between the rear surface of earpiece speaker 17 and peripheral wall 73, cushion material 23 is formed with a thickness greater than the distance between the rear surface of earpiece speaker 17 in space 25 in the casing and the inner wall surface (in the present embodiment, standing tip surface 75) of rear casing 15. Thus, front casing 13 and rear casing 15 are combined, cushion material 23 held in either the rear surface or standing tip surface 75 are compressed at a fixed compression rate (for example, about 50%).

At this time, since the rear surface and standing tip surface 75 are parallel, the compression rate of cushion material 23 is the same at any position in the circumferential direction. Thus, cushion material 23 is able to more reliably cut off the ringtone from the rear surface entering from space 25 in the casing to the rear space of earpiece speaker 17.

Thus, according to cordless phone 11 of the present embodiment, it is possible to yield a large volume, and prevent sound from creeping from ringtone speaker 19 to earpiece speaker 17, with a simple structure.

While embodiments have been described with reference to the drawings, it is to be understood that the present disclosure is not limited thereto. It is apparent to those skilled in the art that changes and modifications are conceivable within the scope described in the claims, and it would be appreciated that those naturally belong to the technical scope of the present disclosure.

What is claimed is:

1. A cordless phone comprising:
   an earpiece speaker configured to output reception sound;
   a ringtone speaker configured to output a ringtone;
   a front casing, in which the earpiece speaker is held and which includes a reception sound opening covering the earpiece speaker;
   a rear casing, in which the ringtone speaker is held and which includes a ringtone opening covering the ringtone speaker, wherein the rear casing further includes an earpiece speaker rear opening different from the ringtone opening, the earpiece speaker rear opening covering the earpiece speaker such that the earpiece speaker rear opening formed in the rear casing and the reception sound opening formed in the front casing interpose the earpiece speaker in-between; and
   a cushion held in contact between a rear surface of the earpiece speaker and an inner wall surface of the rear casing, wherein the cushion has an inner hole and is shaped to surround an outline of the earpiece speaker rear opening.

2. The cordless phone of claim 1, wherein the cushion is in a ring shape or a polygonal shape having the inner hole.

3. The cordless phone of claim 1, wherein the cushion is configured to seal a space between the rear surface of the earpiece speaker and the earpiece speaker rear opening to facilitate output of the reception sound from the earpiece speaker through the earpiece speaker rear opening.

4. The cordless phone of claim 1, wherein the cushion is configured to block output of the ringtone from the ringtone speaker from entering a space between the rear surface of the earpiece speaker and the earpiece speaker rear opening.

5. The cordless phone of claim 1, wherein the cushion is made of material having a defined compression rate.

6. The cordless phone of claim 5, wherein the cushion has an original thickness greater than a distance between the rear surface of the earpiece speaker and the inner wall surface of the rear casing, and is compressed according to the defined compression rate when the cordless phone is assembled.

7. The cordless phone of claim 5, wherein the defined compression rate is 50%.

* * * * *